Nov. 13, 1951 — A. O. ZORN — 2,574,772
IMPLEMENT ASSEMBLY FOR ROTARY TILLERS
Filed Sept. 23, 1949
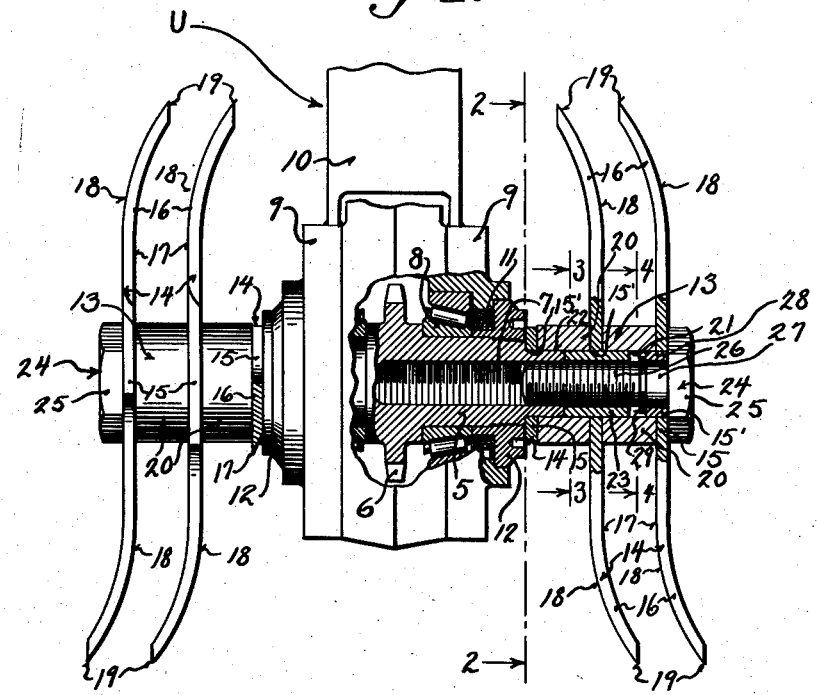
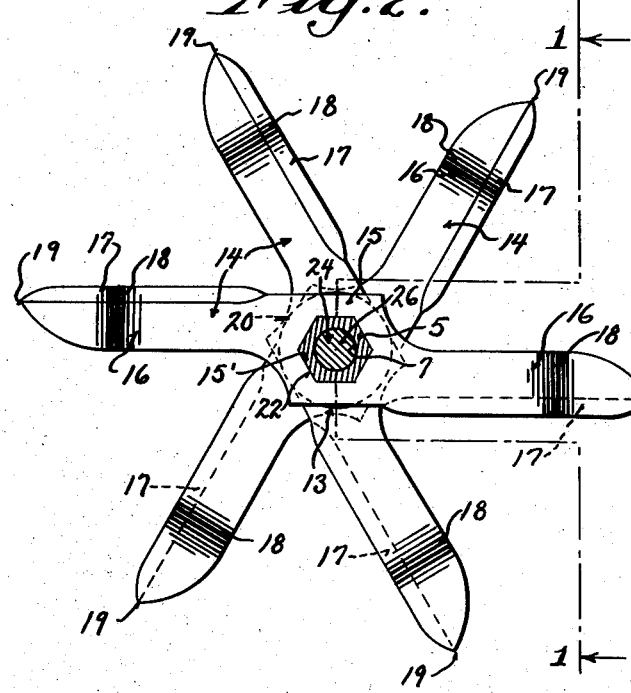
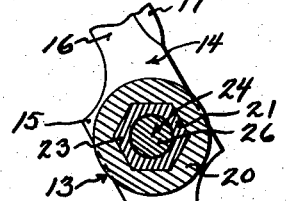
INVENTOR
ALLEN O. ZORN
BY
ATTORNEYS Patented Nov. 13, 1951

2,574,772

UNITED STATES PATENT OFFICE 2,574,772

IMPLEMENT ASSEMBLY FOR ROTARY TILLERS

Allen O. Zorn, Brillion, Wis., assignor to Ariens Company, Brillion, Wis.

Application September 23, 1949, Serial No. 117,320

2 Claims. (Cl. 97—220)

This invention appertains to rotary tillers, cultivators and the like, of the type shown in the patent of Mando S. Ariens, No. 2,364,043, of December 5, 1944, and is an improvement on the mounting of the tines or earth working blades as illustrated in the pending Ariens application, Serial No. 702,969, filed October 12, 1946.

One of the primary objects of the present invention, is to provide a novel and simple means for detachably mounting the ground working tines or blades on the rotary shaft of a cultivator unit, whereby the blades can be quickly and conveniently removed for re-sharpening and the like.

Another salient object of the invention is to provide means whereby the blades will be properly and accurately spaced and at the desired angle relative to one another on the shaft.

A further important object of my invention is to provide a durable and efficient means for permitting any desired number (within certain limits) of the blades to be associated with the shaft for rotation therewith.

A still further object of the invention is to provide a novel ground working member for efficiently acting on the soil and for quick attachment to the tiller shaft formed from a single piece of metal and embodying a flat hub having a polygonal bore and outwardly extending blades disposed on opposite sides of the diametric center of the hub, the blades being sharpened on one edge and curved in opposite directions from the hub for covering the relatively wide area of ground.

With these and other objects in view, the invention consists in the novel construction, arrangement and formation of parts, as will be hereinafter more specifically described and claimed, and illustrated in the accompanying drawing, in which drawing, Figure 1 is a fragmentary sectional view of the lower end of a tiller unit constructed in accordance with this invention, the parts shown in section being taken on the line 1—1 of Figure 2, looking in the direction of the arrows.

Figure 2 is a transverse sectional view through the tiller unit taken on the line 2—2 of Figure 1, looking in the direction of the arrows, the view illustrating the novel formation of the ground working implements or blades.

Figure 3 is a fragmentary transverse sectional view taken on the line 3—3 of Figure 1, looking in the direction of the arrows disclosing the arrangement of the internal supporting sleeve and the external spacing washer sleeve.

Figure 4 is a section similar to Figure 3, but taken on the line 4—4 of Figure 1, looking in the direction of the arrows and illustrating the collar for the outermost ground working implement or blade carried by the assembly screw.

Referring to the drawing in detail, wherein similar reference characters designate corresponding parts throughout the several views, the letter U indicates a fragment of a tiller unit of the type shown in the Ariens pending application, heretofore mentioned, and as illustrated the tiller unit includes a short tiller shaft or hub 5 having formed or keyed centrally thereto a sprocket wheel 6. The sprocket wheel 6 forms means for permitting the driving of the tiller shaft 5. The shaft 5 is preferably hollow with its ends internally threaded, as at 7, for a purpose, which will later appear. On each side of the sprocket 6, the shaft is provided with roller bearings 8, and these bearings are received in bearing caps 9, which are fitted in the opposite sides of a hollow arm or casting 10. Between the tiller shaft 5 and the bearing caps 9, and on opposite sides of the bearings, can be placed oil retaining rings 11. A lock washer 12 can be threaded on the outer ends of the shaft against the caps 9 for holding the bearings in place.

In accordance with this invention, novel means 13 is provided for detachably securing and locking a desired number of ground working implements 14 to the opposite ends of the shaft 5. This means 13 will be specifically set forth.

Attention is directed to the novel earth working implements 14, and these implements can be constructed in various manners. Each implement is preferably formed from tool steel and includes a flat hub 15 having an axial polygonal bore 15'. The bore is preferably of a hexagonal shape. Extending outwardly from the opposite sides of the hub 15, are blades 16 and as clearly shown in Figure 2, the blades lie on opposite sides of the diametric center of the hub 15. The blades have their leading edges sharpened as at 17 and the blades are curved in opposite directions as at 18 from the hub. The outer ends of the blades are preferably tapered to a point as at 19.

The novel means 13 for connecting the blades 14 with the opposite ends of the shaft include a series of external spacer washer sleeves 20. These sleeves are all of the same length and each include a polygonal bore 21, preferably of a hexagonal shape in cross section. In accordance with the invention, the outer faces of the ends of the shaft 5 are of a polygonal shape, as indicated by the reference character 22, and in the present instance, of a hexagonal shape in cross section. The shaft ends 22 are of a size to fit snugly within the polygonal bore 21 of a spacer washer sleeve 20. In conjunction with the external spacer washer sleeve 20, I employ internal supporting sleeves 23.

In conjunction with the washer sleeves 20 and the internal supporting sleeve 23, I employ an axially disposed assembly screw 24. This screw includes an enlarged head 25 and a threaded shank 26. A portion of the shank just inward of the head 25 is left round and smooth as at 27, for the reception of a rotatable collar 28. This collar has its outer surface of a polygonal shape and preferably hexagonal. The outer face of the supporting sleeve 23, is also of a polygonal shape and preferably hexagonal and the outer surfaces of the shaft ends 22, the supporting sleeve 23 and the collar 28 are all of the exact same size, for a purpose which will also later appear.

To hold the collar 28 in place against longitudinal movement on the screw 24, a split ring 29 is sprung in an annular groove in the shank of the screw against the collar. By this arrangement, the screw can be turned without rotation of the collar 28.

The assembly 13 for each shaft end is identical and the parts are assembled as follows:

One ground working implement 14 is placed upon the polygonal end 22 of the shaft after which one spacer washer sleeve 20 is slid on the shaft and against the implement so as to force the implement in tight contact with a shouldered portion of the shaft and the lock washer 12. The supporting sleeve 23 is now slid into the spacer washer sleeve 20, after which the next ground working implement is slid on the sleeve 23 against the spacer washer sleeve 20. The second spacer washer sleeve 20 can now be slid on the supporting sleeve 23 against the ground working implement. The third and final ground working implement is placed on the collar 28 of the assembly screw 24 and the assembly screw is placed longitudinally through the spacer washer sleeves 20 and the supporting sleeve 23, and is threaded into the tiller shaft, 5. As the screw is threaded in place, the collar slides into the adjacent spacer washer sleeve 20 and the ground working implement on the collar and the collar is held against rotation during the tightening of the screw. Thus, the entire assembly is held in place by the tightening of the single assembly screw and by using screws of different lengths and the desired number of spacer and supporting sleeves, a desired number of ground working implements can be utilized with the tiller shaft. In the present instance, I have shown three ground working implements carried by each end of the shaft. It is to be also understood that less ground working implements can be employed should such be preferred.

Due to the hexagonal shape of the shaft ends 22, the supporting sleeve 23 and the collar 28, the ground working implements can be readily held against movement relative to one another and at a desired angle relative to one another.

Much stress is laid on the formation of the ground working implements 14 and due to the construction thereof, the same can be readily made and sharpened and the same will effectively work a relatively large area of ground, in view of their oppositely extending curved ends.

Changes in details may be made without departing from the spirit or the scope of this invention, but what I claim as new is:

1. A rotary cultivator tiller unit comprising a rotatable tiller shaft having an internally threaded bore and polygonal terminals, a ground working implement having a hub provided with a polygonal bore fitted on the polygonal end of the shaft, a spacer sleeve having a polygonal bore also fitted on the polygonal end of the shaft, a supporting sleeve of the same exterior shape and size as the polygonal end of the shaft fitted in the spacer sleeve, a second ground working implement fitted on the supporting sleeve against the spacer sleeve, a second spacer sleeve fitted on the supporting sleeve against the second ground working implement, and an assembly screw extending through the spacer sleeves and the supporting sleeve and threaded into the tiller shaft.

2. In a rotary tiller unit, a rotatable tiller shaft having an internally threaded bore and a polygonal terminal, a ground working implement having a polygonal shaped hub fitted on the shaft terminal, a spacer sleeve fitted on the shaft terminal against the hub of the ground working implement, a supporting sleeve of the same exterior shape and size as the polygonal shaft and fitted into the spacer sleeve, a second ground working implement fitted on the supporting sleeve at an angle to the first ground working implement, a second spacer sleeve fitted on the supporting sleeve against the second ground working implement, an assembly screw extending longitudinally through the spacer and supporting sleeves and threaded into the shaft, a collar having a polygonal outer face of the same size and shape as the supporting sleeve and shaft terminal rotatably mounted on the screw adjacent to its head, and a third ground working implement fitted on the collar at an angle to the first and second ground working implements, said collar being received and fitted in the second spacer sleeve when said screw is threaded into the shaft.

ALLEN O. ZORN.

REFERENCES CITED

The following references are of record in the file of this patent:

UNITED STATES PATENTS

| Number | Name | Date |
| --- | --- | --- |
| 1,186,375 | Burrows | June 6, 1916 |
| 1,744,597 | Vasconcellos | Jan. 21, 1930 |
| 1,907,567 | Paris | May 9, 1933 |
| 2,256,220 | Sjogren | Sept. 16, 1941 |
| 2,438,189 | Seaman | Mar. 23, 1948 |